Patented Feb. 9, 1926.

1,572,552

UNITED STATES PATENT OFFICE.

JOSEPH MICHELMAN, OF BOSTON, MASSACHUSETTS.

PROCESS FOR OBTAINING PYRROL, PYRROL DERIVATIVES, AND PYROCOLL FROM ANIMAL WASTE.

No Drawing.   Application filed November 11, 1924.   Serial No. 749,341.

*To all whom it may concern:*

Be it known that I, JOSEPH MICHELMAN, a citizen of the United States of America, and resident of Boston, in the county of Suffolk and State of Massachusetts, have invented new and useful Improvements in Processes for Obtaining Pyrrol, Pyrrol Derivatives, and Pyrocoll from Animal Waste, of which the following is a specification.

The present invention pertains to a process for the treatment of certain animal wastes, such as glue-stock, and the recovery of certain decomposition products therefrom, such as pyrrol, pyrocoll and the like.

The destructive distillation of slaughterhouse and tannery wastes in various ways, with concomitant recovery of animal charcoal and ammonia, is well known. In the sense that the raw materials used in such processes may come from varied and indiscriminate sources and that accordingly they may be employed in whatever condition they may be found and the operations involved are in no wise exacting, such processes are economical and convenient commercially. More especially is this the case, in view of the fact that disposal of such refuse is in most districts required by law, regardless of economies. However, by such treatments as those heretofore known and practiced, all other values which may be contained in the waste or scrap are irretrievably lost.

In accordance with a discovery made by me and set forth in my copending application, Serial No. 703,990, filed April 3, 1924, refuse materials of similar nature, namely, leather scrap, may be preferentially subjected to a regulated destructive distillation process, (in accordance with the operations there described) which is directed to the formation and recovery of numerous valuable by-products not heretofore realized. Among other by-products thus obtained, are the chemical compounds pyrrol, pyrrol derivatives, and pyrocoll.

As a part of the present invention it has been discovered that, whereas these distillation products, as ordinarily obtained, from waste organic material of animal origin, are associated with various organic impurities which depreciate the value thereof or require elaborate treatment for their removal, (such for example as the pyridine bases), nevertheless, the presence and formation of such impurities may be avoided.

As a preferred raw material for the purposes of the operation of the present process, animal waste consisting of those parts which are capable of conversion into a glutinous or gelatinous condition, such as internal or external membraneous matter and connective tissue, including hides and even tanned and "detanned" leather scrap and the like, is eminently suitable. In short, such material as is ordinarily termed "glue-stock" in the slaughter houses and leather stocks from the tanneries, and which may be generically termed "collagenous tissue," is especially adapted for use in the present process.

A characteristic qualification of such raw material, which is possibly a determinative factor to which the elimination of impurities may be attributed, is that they shall be substantially free from glycerine or the glycerides of fatty acids. Accordingly, in cases of wastes of doubtful origin, or raw hides, they may be treated advantageously with milk of lime or other agent for removal of such compounds.

In a typical example of the operation of the present process, hides, hide trimmings, fleshings, skivings, etc., may be used as the raw material. These are baled (for ease of handling) and subjected to destructive distillation, out of contact with air, and with or without an inert carrier gas, as desired, suitable provision being made for receiving and condensing the distillate therefrom.

Though not essential, a preliminary treatment with alkali, such as lime, is desirable, similar to that employed in the preparation of hides for tanning or of glue stock in the manufacture of glue. The alkali need not be separated or removed from the stock but is preferably left in admixture therewith, as it is formed into bales or bundles for subsequent treatments. If the material has already been subjected to such treatment, or its equivalent, as with depillated hides, leather etc., it may be employed directly.

In either case, the baled material is charged into appropriate ovens or retorts and heated to a carbonizing temperature, out of contact with air and with or without the assistance of an inert gas, the distillate being condensed and collected in any suitable manner. Upon standing, the combined condensate thus obtained will separate into layers consisting essentially of an oily tarry layer containing pyrrol, pyrocoll, pyrrol derivatives and so forth, while ammonium compounds and the like will be found in the aqueous layer.

The various constituents of the aqueous layer may be separated and recovered in well known ways, as more fully set forth in the application above referred to, but forming no part of the present invention.

On the other hand, the oily or tar-like fraction, which contains substantially all of the desired group of compounds, is treated with a solvent or freely miscible diluent liquid, such as toluol (xylol or naphtha) for example, whereupon the pyrocoll separates more completely in the form of discrete brownish crystals which are relatively insoluble and are readily separated from the liquid mixture by filtration.

The remaining solution or filtrate is then further segregated by fractional distillation into a fraction up to 200° C.; a second fraction, up to 300° C. The former, or pyrrol-toluol fraction is selected, and solid potassium hydroxide is added thereto. The latter, upon digesting at slightly elevated temperature, reacts with the pyrrol or substituted pyrrols contained in the solution, forming the corresponding potassium compounds thereof, which are insoluble and readily separated permitting the recovery of the toluol for re-use. The potassium pyrrols may be hydrolyzed, by the addition of water, to form pyrrols, which separate as an oily layer upon the residual aqueous solution of potassium hydroxide.

The potassium hydroxide solution thus obtained may be used in converting the pyrocoll to alpha pyrrol-carboxylic acid which is readily converted to pyrrol with evolution of carbon dioxide, without contamination by either pyrrol derivatives or pyridine bases, and in substantially pure condition.

Further, pyrrol may be converted into indole by the preliminary polymerization with sulfuric acid to tripyrrol. The latter, upon distillation with steam over potassium hydroxide, yields indole and pyrrol. Substituted pyrrols if present may be converted, by similar treatment, into disubstituted indoles, without the splitting off of pyrrol. Obviously, when a mixture of pyrrol and pyrrol derivatives is treated in the manner described, a mixture of indole and substituted indoles will result. The fraction of the distillate boiling from 200° C. up may contain principally pyrrol derivatives and sometimes hydrocarbon oils, in which case the fraction separates into two layers upon standing, the hydrocarbon oils on top, whereby the constituents of the fraction may be separated and recovered.

In this manner, by the treatment of waste material, there is easily obtained a relatively pure grade of pyrocoll, which is a valuable compound for the organic synthesis of numerous derivatives and also important as an easily purified source for pyrrol. Pyrrol, and substituted pyrrol derivatives are likewise produced, which are capable of conversion into the corresponding indole and indole derivatives, respectively, and which are important organic compounds as will be readily appreciated by those skilled in the several arts in which such compounds may have their origin or use.

While a preferred procedure has been disclosed, as representative of the invention and its application in actual practice to a preferred type of raw material, for the production of pyrrols and pyrocoll, it is to be understood that various modifications may be made therein without departing from the spirit and scope of the invention, and that such modifications are comprehended in the above disclosure and by the following claims.

I claim:

1. A process for the production of pyrrols and pyrocoll which comprises subjecting collagenous tissue to destructive distillation out of contact with air, condensing the distillate therefrom, treating the oily fraction of the condensate with a diluent, and filtering.

2. A process for the production of pyrrols and pyrocoll which comprises subjecting collagenous tissue to destructive distillation, condensing the distillate therefrom, treating the oily condensate with a diluent, filtering, distilling and treating the lower boiling distillate thereof with solid potassium hydroxide.

3. A process for the production of pyrrols and pyrocoll which comprises subjecting collagenous tissue to destructive distillation, subjecting the oily fraction of the distillate to dilution, and separating solid particles of pyrocoll therefrom.

4. A process for the production of pyrrols and pyrocoll which comprises subjecting collagenous tissue to destructive distillation in the presence of an inert gas, adding an inert diluent to the distillate, and filtering the solid particles of insoluble pyrocoll therefrom.

5. A process for the production of pyrrols and pyrocoll which comprises subjecting collagenous tissue to destructive distillation, adding an inert diluent to the oily portion of the distillate, filtering the pyrocoll therefrom, and treating the filtrate for recovery of pyrrol and its derivatives.

6. A process for the production of pyrrols and pyrocoll which comprises subjecting collagenous tissue to destructive distillation, diluting the oily fraction of the distillate, filtering pyrocoll therefrom, distilling and adding solid potassium hydroxide to the low boiling distillate thus obtained, and separating potassium pyrrols therefrom.

7. A process for the production of pyrrols and pyrocoll which comprises subjecting collagenous tissue to destructive distillation, diluting the oily fraction of the distillate, filtering pyrocoll therefrom, adding solid potassium hydroxide to the filtrate thus obtained, separating potassium pyrrols therefrom, and subsequently hydrolyzing said potassium compounds to the corresponding pyrrols.

8. A process for the production of pyrrols and pyrocoll which comprises subjecting collagenous tissue to destructive distillation, diluting the oily fraction of the distillate, filtering pyrocoll therefrom, and distilling the filtrate into two fractions containing the lower boiling and the higher boiling pyrrol derivatives, respectively.

9. A process for the production of pyrrols and pyrocoll which comprises subjecting collagenous tissue to destructive distillation, diluting the oily fraction of the distillate with an organic solvent miscible therewith, filtering pyrocoll therefrom, and distilling the filtrate into fractions containing the lower boiling and higher boiling pyrrol derivatives respectively.

10. A process for the production of pyrrols and pyrocoll which comprises subjecting collagenous tissue to destructive distillation out of contact with air, condensing the distillate and separating the pyrocoll content thereof.

Signed by me at Boston, Massachusetts, this eighth day of November, 1924.

JOSEPH MICHELMAN.